UNITED STATES PATENT OFFICE.

FREDERICK KOSKUL, OF PHILADELPHIA, PENNSYLVANIA.

IMPROVEMENT IN PROCESSES OF MANUFACTURING ARTIFICIAL STONE.

Specification forming part of Letters Patent No. 200,834, dated March 5, 1878; application filed April 27, 1877.

*To all whom it may concern:*

Be it known that I, FREDERICK KOSKUL, of the city of Philadelphia, State of Pennsylvania, have invented a certain new and useful Process in the Manufacture of Artificial Stone, of which the following is a specification:

This invention relates to that class of prosses employed in manufacturing, from compositions of various substances which will stand a high temperature, an artificial stone to be used as a substitute for natural stone for paving, tiling, building, ornamental, and other similar purposes.

The base of my invention is soluble glass; but my method or process of using it in the manufacture of artificial stone differs altogether from any method or process now known or used, as the following description will show.

No. 1: I first prepare a solution of soluble glass in water, in varying proportions, and add pulverized common clay to this solution, and bring it to about the consistency of thick milk.

No. 2: I then prepare finely-pulverized soluble glass, about one part, and about nine parts of fine sand or stone-dust, adding, when required, the necessary quantity of fire-proof colors, and mix the whole thoroughly in a dry state.

I then mix the two compositions above described—No. 1 and No. 2—together to the consistency of thick mortar, when, from this composition, the stones are formed in any desired shape, and allowed to dry. When dry they are dipped, in a hot state, several times into a hot solution of soluble glass, until a coat begins to show on the surface of the stones; or, where more convenient, the hot stones may be saturated with a hot solution by means of a brush, or in any other way. After being thus saturated, the stones are dried, and when dry, put into an oven and baked. The result will be an artificial stone equal in hardness and adaptability for use to natural stone, and which will bear the highest polish, and be absolutely fire and water proof.

It will be readily seen that by this method of using the soluble glass a variety of compositions of different substances may be used in the manufacture of artificial stone, provided the composition will stand a high temperature.

The following are a few of the many compositions I might name which may be by this process converted into artificial stone of a greater or less degree of excellence, viz: first, common clay and soluble glass; second, sand, stone-dust, or glass-powder, &c., mixed with chalk and soluble glass; third, lime in a pulverized state and pulverized soap-stone and soluble glass; fourth, sulphate of antimony and soluble glass; fifth, zinc-white or white lead and soluble glass, &c.

In using common clay for this purpose it is only necessary to follow the process I have described, without using any other ingredients than the common clay and the soluble glass. In artificial stone thus made from clay the blocks, when of large size, may be made hollow, so as to permit them to be properly baked, and the visible surface or surfaces leveled and finished by applying another coat of clay and soluble glass, common clay or clay of a better quality being used for this purpose, with the addition of any desired fire-proof color.

Large stones may be made sponge-like by putting any of the above-named compositions in a humid state, together with an addition of soluble glass, into a mold, the mold being only half or three-fourths filled therewith, and the mold be then well covered and put into the oven. When the stone is thus baked it will be found to have filled the mold and conformed to its shape, and, though sponge-like, it will be hard. This stone is then dipped in or saturated with a thin solution of soluble glass and chalk, and when dry is again baked.

It will be readily seen that quite a large stone may be made hard through and through by this process.

The stones, when dry, may be dipped in or saturated with sulphate of alumina and soluble glass in solution alternately, in the method I have described, with advantage.

What I claim, and desire to secure by Letters Patent, is—

The method or process of dipping an artificial stone, in a heated state, into or saturating it with a heated solution of soluble glass before baking it, substantially for the purposes and in the manner herein described.

FREDERICK KOSKUL.

Witnesses:
WM. C. GROSS,
JOHN R. QUIN.